US012686970B2

(12) United States Patent
Fechter et al.

(10) Patent No.: US 12,686,970 B2
(45) Date of Patent: Jul. 21, 2026

(54) RECYCLING OF LIGNOCELLULOSIC FIBERS FROM FIBERBOARDS

(71) Applicant: Inter IKEA Systems B.V., LN Delft (NL)

(72) Inventors: Jan-Olof Fechter, Alvesta (SE); Michael Germann, Laatzen (DE); Pontus Håkansson, Älmhult (SE); Martin Siewert, Rollshausen (DE)

(73) Assignee: Inter IKEA Systems B.V., Ln Delft (NL)

( * ) Notice: Subject to any disclaimer, the term of this patent is extended or adjusted under 35 U.S.C. 154(b) by 894 days.

(21) Appl. No.: 17/782,062

(22) PCT Filed: Dec. 2, 2020

(86) PCT No.: PCT/SE2020/051161
§ 371 (c)(1),
(2) Date: Jun. 2, 2022

(87) PCT Pub. No.: WO2021/112749
PCT Pub. Date: Jun. 10, 2021

(65) Prior Publication Data
US 2023/0002584 A1 Jan. 5, 2023

(30) Foreign Application Priority Data
Dec. 3, 2019 (SE) .................................... 1951380-3

(51) Int. Cl.
*D21B 1/36* (2006.01)
*B09B 3/35* (2022.01)
(Continued)

(52) U.S. Cl.
CPC .................. *D21B 1/36* (2013.01); *B09B 3/35* (2022.01); *B09B 3/45* (2022.01); *C08J 11/14* (2013.01);
(Continued)

(58) Field of Classification Search
CPC ................................. Y02W 30/78; D21B 1/36
See application file for complete search history.

(56) References Cited

U.S. PATENT DOCUMENTS

| | | | |
|---|---|---|---|
| 3,741,863 A | 6/1973 | Brooks | |
| 6,648,251 B1 | 11/2003 | Chollet | |
| 2003/0056873 A1 | 3/2003 | Nakos et al. | |

FOREIGN PATENT DOCUMENTS

| | | |
|---|---|---|
| CN | 1063298 A | 8/1992 |
| CN | 102470545 A | 5/2012 |

(Continued)

OTHER PUBLICATIONS

Pazitny A., Steam explosion of wood particles from fibreboard and particle board with indirect control by enzymatic hydrolysis, 2019, Acta Chimica Slovaca, vol. 12, No. 2 pp. 185-191. (Year: 2019).*

(Continued)

*Primary Examiner* — Anthony Calandra
(74) *Attorney, Agent, or Firm* — Renner, Otto, Boisselle & Sklar, LLP

(57) ABSTRACT

A process for recycling lignocellulosic fibers from a fiberboard (100) comprising compressed lignocellulosic fibers bonded together by a binding agent. The process comprises the steps of: —disintegrating (101) the fiberboard (100) to provide fiberboard pieces (110); —steaming (111) the fiberboard pieces (110) to decompress and release the lignocellulosic fibers by hydrating them, as well as hydrolyzing the binding agent; —releasing the overpressure; —removing excess water vapor to provide portions (120) comprising released lignocellulosic fibers; and —separating (121) the lignocellulosic fibers in the portions (120) comprising released lignocellulosic fibers to provide recycled lignocellulosic fibers (130).

18 Claims, 2 Drawing Sheets

(51) Int. Cl.

| | |
|---|---|
| *B09B 3/45* | (2022.01) |
| *C08J 11/14* | (2006.01) |
| *C08L 97/02* | (2006.01) |
| *D21B 1/12* | (2006.01) |
| *B27N 3/00* | (2006.01) |
| *B27N 3/04* | (2006.01) |

(52) U.S. Cl.

CPC ................ *C08L 97/02* (2013.01); *D21B 1/12* (2013.01); *B27N 3/007* (2013.01); *B27N 3/04* (2013.01); *C08J 2397/02* (2013.01); *C08L 2205/16* (2013.01); *Y02W 30/78* (2015.05)

(56) References Cited

FOREIGN PATENT DOCUMENTS

| | | | | |
|---|---|---|---|---|
| DE | 4224629 | A1 | 1/1994 | |
| EP | 0090969 | A1 * | 3/1983 | .............. D21C 3/20 |
| JP | 2017185640 | A | 10/2017 | |

| | | | | |
|---|---|---|---|---|
| WO | 96033309 | A1 | 10/1996 | |
| WO | 98024605 | A1 | 6/1998 | |
| WO | WO-0001877 | A1 * | 1/2000 | ............ D21B 1/026 |
| WO | 01039946 | A1 | 6/2001 | |

OTHER PUBLICATIONS

NIST Saturated Steam Tables, downloaded online Mar. 11, 2025 (Year: 2025).*
English Machine Translation of JP2017185640A. (Year: 2017).*
7754-7765Wan et al., Recycling Wood Composite Panels: Characterizing Recycled Materials, 2014, Bioreources,9(4), pp. 7754-7765. (Year: 2014).*
English Machine translation EP0090969A1, 1983. (Year: 1983).*
English Machine Translation of claims of JP201785640A (Year: 2017).*
International Search Report and Written Opinion corresponding to Application No. PCT/SE2020/051161 mailed on Jan. 8, 2021.
Chinese Office Action for corresponding Chinese Application No. 202080083603.6 issued Dec. 15, 2022, with English translation.

* cited by examiner

RECYCLING OF LIGNOCELLULOSIC FIBERS FROM FIBERBOARDS

This application is a national phase of International Application No. PCT/SE2020/051161 filed Dec. 2, 2020, which claims priority to Swedish Application No. 1951380-3 filed Dec. 3, 2019, the disclosures of which are hereby incorporated herein by reference in their entireties.

FIELD OF THE INVENTION

The present invention relates to a process of recycling lignocellulosic fibers from a fiberboard, e.g. HDF MDF, or LDF, comprising compressed lignocellulosic fibers and a binding agent.

BACKGROUND

Fiberboard is an engineered wood product that is made out of lignocellulosic fibers, most typically wood fibers. The lignocellulosic fibers in fiberboard are oblong (the ratio length:width typically exceeds 10), which are fairly short, e.g. less than 5 mm. In order to provide fiberboard, wood fibers are pressed, typically with a binder (e.g. a urea-formaldehyde resin). Fiberboard is a fairly dense product typically having a density of at least 0.5 kg/dm$^3$.

Another engineered wood product is particleboard. Particleboard is less dense and comprise larger, more irregular wood particles. Particleboard is a cheap product, typically used when cost is a more decisive factor than strength. Particleboard may be mechanically re-recycled as the board is not too dense to allow for simple mechanical disintegration. Further, the wood particles in particleboard are large and thus tolerant to mechanical disintegration. Even if their size is reduced, the wood particles still be sufficiently large to provide the desired mechanical properties to particleboard comprising re-cycled wood particles.

U.S. Pat. No. 6,648,251 relates to a device for disaggregating pieces of derived timber products from cellulose and/or lignocellulose-containing products, especially particle boards, with a transport device and at least one disaggregation container. The disaggregating process comprises soaking the material with preheated water. By conveyance by the screw feeder within, the device allows for homogenization of the wood pulp. The constant friction caused by the conveyance creates desirable and continuous comminution. Similarly to U.S. Pat. No. 6,648,251, DE4224629 discloses a process for recycling particle boards comprising exposing the particle board to saturated water vapor atmosphere. In the disclosed process, the particle boards are firstly dampened. Further, high pressure (4 to 5 bar over pressure) and temperature (140 to 160° C.), is typically used. Subsequent to the exposure to saturated water vapor atmosphere, urea residues are washed away from the fibers by water.

In U.S. Pat. No. 3,741,863, a process for providing cellulosic fibers and fiber bundles from sources of waste material, such as municipal waste is disclosed. The process is somewhat related to the one in U.S. Pat. No. 6,648,251, but requires sterilization and inert conditions. Further, the waste material is abraded at high temperature, e.g. about 480° F. (250° C.).

Fiberboards, especially medium-density fiberboards (MDF), are used a lot in the furniture industry. They have a smoother and more homogenous interior than particleboard. Further are they stronger. Types of fiberboard in the art include low-density fiberboard (LDF), medium-density fiberboard (MDF), and hardboard (HDF). For pieces of furniture that will be visible, a veneer of wood is often glued onto fiberboard to give it the appearance of conventional wood. Fiberboards are produced from fresh wood. Recycling of fiberboards and especially HDF to produce new fiberboards is known to be difficult and costly.

There is however a growing interest in sustainability throughout the world. In the furniture industry there is thus a need for improved methods of cycling of fiberboards to reduce the use of fresh wood. Especially, it would be of interest to be able to recycle fiberboards in furniture in a more cost efficient way.

SUMMARY

Accordingly, there is according to a first aspect of the invention provided a process for recycling lignocellulosic fibers from a fiberboard. As recognized by the skilled person, lignocellulosic fibers are derived from plant dry matter, e.g. wood. The fibers are composed of cellulose and hemicellulose tightly bound to lignin, a cross-linked phenolic polymer. Fiberboards are boards comprising compressed lignocellulosic fibers bonded together by binding agent. The binding agent is typically separately added to the fibers. Examples of binding agents include MUF (melamine urea formaldehyde), MDI (methylene diphenyl isocyanate), and lignin (in addition to lignin comprised by the fibers). The binding agent is added to allow for binding the fibers together in pressing the fibers and the binding agent to provide the board. According to an embodiment, the fiberboard to be recycled is a dense board having a density of at least 0.5 kg/dm$^3$, such as at least 0.6 kg/dm$^3$ or 0.7 kg/dm$^3$. The fiberboard to be recycled may have density of 0.8 kg/dm$^3$ to 1.0 kg/dm$^3$.

The re-cycled lignocellulosic fibers may be used in making a new fiberboard. They may be used on their own or being mixed with virgin fibers. In order to allow for recycling, the process has to be gentle, i.e. the fiber length should not be essentially reduced, as the fiber length is important for the structural integrity of the fiberboard. This is major difference between recycling of particleboard on the one hand and fiberboard on the other. Particles in particleboards are far more tolerant to abrasion in recycling of them.

The present process for recycling lignocellulosic fibers from a fiberboard comprises the steps of disintegrating the fiberboard to provide fiberboard pieces and steaming the fiberboard pieces to decompress and release the lignocellulosic fibers by hydrating them, as well as hydrolyzing the binding agent.

In order to facilitate processing of the fiberboard and to increase the surface area, the fiberboard is typically disintegrated into pieces. The pieces are typically 15 to 50 mm in diameter. As the thickness of fiberboard to be recycled typically is less than 50 mm, such as 5 to 40 mm, whereas the width and length typically exceeds 100 mm, the disintegration may provide flakes thinner than 50 mm.

In steaming the pieces, they are subject to steam at pressure above atmospheric pressure (i.e. the absolute pressure exceeds 1 bar) and at a temperature higher than 100° C. (i.e. above the boiling point of water at atmospheric pressure). Typically, the pieces are steamed at a pressure of 1.1 to 10 bar absolute pressure and at a temperature of 103° C. to 180° C. By steaming the fiberboard pieces, the binding agent is hydrolyzed whereby the lignocellulosic fibers are released from each other. Further, the steaming hydrates the lignocellulosic fibers and the cells within the fibers decompress to essentially retake their original shape (in pressing lignocellulosic fibers into fiberboards, the cells of the ligno-cellulosic fibers are decompressed). In addition to the hydration and hydrolysis, the steaming softens lignin, thereby further affecting the release of the fibers from each other.

In processes in the art for recycling lignocellulosic fibers from e.g. particle boards, a step of pre-hydrating the boards have been employed. As an example, soaking in water has been employed. In U.S. Pat. No. 6,648,251, it is taught to soak the particleboard with heated water (<95° C.) before steaming the particleboard. The soaking serves to provide a wet mass, forming a plug in the subsequent steaming in a plug screw feeder. Further, the soaking serves to facilitate the release of fibers and particles from the particles pressed into a particleboard.

However, soaking the particleboards before steaming them in a plug screw feeder implies that the released fibers are wet. They thus have to be dried to allow for their use in particleboard production. Drying add substantial cost to the process.

It was realized that the need for drying could be significantly lowered, or even dispensed with, in re-cycling lignocellulosic fibers from a fiberboard, if steaming essentially dry pieces of fiberboard pieces, rather than pre-soaked fiberboard pieces. Thus, the moisture content of the fiberboard pieces to be steamed should not exceed 30% based on the dry weight of the fiberboard pieces. The moisture content of the fiberboard pieces to be steamed is typically lower than 30% based on the dry weight of the fiberboard pieces. Thus, the moisture content of the fiberboard pieces to be steamed may according to an embodiment not exceed 25%, such as not exceeding 20%, 15%, or 10%. According to an embodiment, the present process does not comprise any step of allowing the fiberboard pieces to absorb liquid water, e.g. soaking the fiberboard pieces in water.

Surprisingly and contrary to related teachings in the art, it was shown that pre-wetting was not necessary in re-cycling lignocellulosic fibers from a fiberboard. As shown herein, it was sufficient to steam the fiberboard pieces at pressure of 1.1 to 10 bar absolute pressure and at a temperature of 103° C. to 180° C. to decompress and release the lignocellulosic fibers. By avoiding treatment of the fiberboard with water in liquid form, most of the steam will evaporate once the pressure is released subsequent to the steaming. The present process thus comprises the step of releasing the overpressure once the fiberboard pieces has been steamed. Though not necessary, the fiberboard pieces may be heated prior to the steaming to reduce or even avoid initial condensation of steam.

Once the overpressure has been released, excess water vapor is removed, whereby providing portions comprising released lignocellulosic fibers. In this manner, portions comprising released lignocellulosic fibers with low the moisture content may be provided. In the steaming step, the fiberboard pieces are inherently heated. The residual heat will vaporize some of the steam having condensed or having being absorbed by the lignocellulosic fibers thus lowering the moisture content of the portions comprising released lignocellulosic fibers.

The combination of fiberboard pieces being steamed, having a low moisture content, and the fiberboard pieces, having residual heat vaporizing remaining moisture, implies that the moisture content in the portions comprising released lignocellulosic fibers is low. The moisture content in the portions comprising released lignocellulosic fibers may be 15 to 30%. Preferably, the portions comprising released lignocellulosic fibers are not saturated with water. Hence, they are appreciated as dry. This will significantly lower the need for drying them before using them in fiberboard production. Actually, the need to dry them may even be dispensed with. However, the process typically comprises a drying step in order to facilitate further processing steps, e.g. a size-sorting step. The drying step may be provided before a separation step, separating the released lignocellulosic fibers. Further, the drying step may be provided after such a separation step. Additional processing and transport of the lignocellulosic fibers will be easier as they fibers are less dense and as they do no stick to each other.

Formation of some condense water is hard to avoid in the steaming step. Thus, it is preferred to perform the steaming in manner such that fiberboard pieces are separated from any condense water, i.e. such that they are not brought into contact with any condense water. Typically, condense water may be present at the bottom of a steaming vessel used. In steaming the fiberboard pieces, they may thus be present on a distance element (e.g. a net-basket or a permeable conveyor belt) keeping the fiberboard pieces, as well as the resulting portions comprising released lignocellulosic fibers, separate from any condense water, but still providing the steam with access to the fiberboard pieces.

After the steaming, the lignocellulosic fibers are released from each other, but they are present as fluffy and resilient, pillow like portions comprising lignocellulosic fibers. The lignocellulosic fibers are however still loosely attached to each other. Subsequently to having removed excess water vapor, the lignocellulosic fibers in portions comprising released lignocellulosic fibers may thus, at least partly, be separated from each other to provide recycled lignocellulosic fibers. As the fibers already have been released from each other, no harsh processing is required. The separation is thus applied as a gentle mechanical treatment, essentially not causing any abrasion and related shortening of the lignocellulosic fibers.

Once the re-cycled lignocellulosic fibers have been separated, they may be subject to a size-sorting step. As recognized by the skilled person, lignocellulosic fibers may be size sorted in various ways, e.g. by sifting and/or sieving. The size-sorting step may provide various size fractions of recycled lignocellulosic fibers. As an example fractions of: a) less than 0.3 mm; b) 0.3 to less than 1 mm; and c) 1 mm or more, may be provided. In recycling the lignocellulosic fibers it may according to some embodiments be desired to discard the smallest fraction.

In steaming the fiberboard pieces, the pressure may be 1.1 to 10 bar absolute pressure. Further, the temperature may be 103° C. to 180° C. The steam used may be super-heated, i.e. heated above saturation. However, the steam used is typically saturated. The saturation point for steam is known. As example, the temperature of saturated steam at 1.5 bar absolute pressure is 111° C.

Even though use of a higher temperature in the steaming step implies that the residence time in the steaming step may be shorter, it may still be preferred to use low pressure steam, given the overall process economy. According to an embodiment, the fiberboard pieces are steamed at a pressure of 1.1 to 7 bar absolute pressure and at a temperature of 103° C. to 165° C. The fiberboard pieces may be steamed at a pressure of 1.2 to 6 bar absolute pressure and at a temperature of 105° C. to 159° C. Further, they may be steamed at a pressure of 1.5 to 3 bar absolute pressure and at a temperature of 111° C. to 134° C. Furthermore, they may be steamed at a pressure of 1.1 to 2 bar absolute pressure and at a temperature of 103° C. to 120° C., such as more than 1.1 bar to less than 2 bars and at a temperature of more than 103° C. to less than 120° C. (e.g. at a pressure of 1.2 to 1.9 bar absolute pressure and at a temperature of 105° C. to 119° C.). According to an embodiment, the fiberboard pieces are steamed at a pressure of 1.2 to 1.7 bar absolute pressure and at a temperature of 105° C. to 115° C., such as at a pressure of about 1.5 bar absolute pressure and at a temperature of 105° C. to 112° C.

As mentioned herein above, the residence time is linked to the temperature in the steaming step. A somewhat higher temperature implies that the residence time may be shorter. Still, moderate temperatures are preferred in the steaming step. Applying moderate pressure and temperature provides a cost efficient, but still effective process. At a temperature of about 110° C. (i.e. about 1.5 bar absolute pressure) the residence time may be about 15 minutes. According to an embodiment, the residence time in the step of steaming the fiberboard pieces is 1 to 60 minutes, such as 2 to 30 minutes or 5 to 20 minutes.

The fiberboard to be recycled may be LDF (Low Density Fiberboard), MDF (Medium Density Fiberboard), or HDF (High Density Fiberboard). The fiberboard to be recycled is typically MDF (Medium Density Fiberboard) or HDF (High Density Fiberboard). Especially MDF, but also HDF and to some extent LDF, is used in furniture. Indeed, one of the objectives of the present invention is to allow for re-cycling of lignocellulosic fibers from in furniture comprising LDF, MDF and/or HDF. Before the steaming, the fiberboard is disintegrated. It may be disintegrated by e.g. crushing and/or shredding the fiberboard into fiberboard pieces. Further, also other disintegration methods may be used, e.g. grinding, milling, and refining. However, there is typically no need to pulverize the fiberboard. Further, grinding, milling, and refining may reduce the length of the lignocellulosic fibers and are thus less preferred. Subsequently, the fiberboard pieces may be subject to a pre-cleaning step to remove metals (magnetic), aluminum, and/or sand/stones.

In processing the fiberboard to recycle lignocellulosic fibers therefrom, it preferred to is preferably processed in manner such that the average length of the recycled ligno-cellulosic fibers is at least 75%, such as at least 80% or 90% of the average length of the lignocellulosic fibers used to manufacture the fiberboard to be recycled.

Thus, it is preferred to avoid mechanical abrasion in processing the fiberboard pieces. According to an embodiment, the fiberboard pieces are not being mechanically abraded in steaming them. Especially, they are according to such an embodiment not processed by means of a plug screw feeder, though they may be steamed in a transport screw. If being steamed in a transport screw, formation of a plug and the associated pressure build up is avoided according to such an embodiment.

The lignocellulosic fibers are re-cycled to allow for the manufacture of new fiberboards. According to an embodiment, the process further comprises the steps of:

mixing the recycled lignocellulosic fibers with a binding agent, and optionally virgin lignocellulosic fibers;
arranging the resulting mixture into a layer; and
compressing the layer into a fiberboard comprising recycled lignocellulosic fibers. In compressing the layer into a fiberboard, the layer is typically heated. The resulting fiberboard may be MDF. In manufacturing new fiberboards using the recycled lignocellulosic fibers, conventional methods for fiberboard production may be used. This is advantageous as it dispenses with the need for modifying existing production lines.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DETAILED DESCRIPTION

The following description focuses on an embodiment of the present invention applicable to a process for providing a fiberboard comprising lignocellulosic fibers from re-cycled furniture, HDF etc. However, it will be appreciated that the invention is not limited to the specific exemplary embodiment described.

Figure 1:
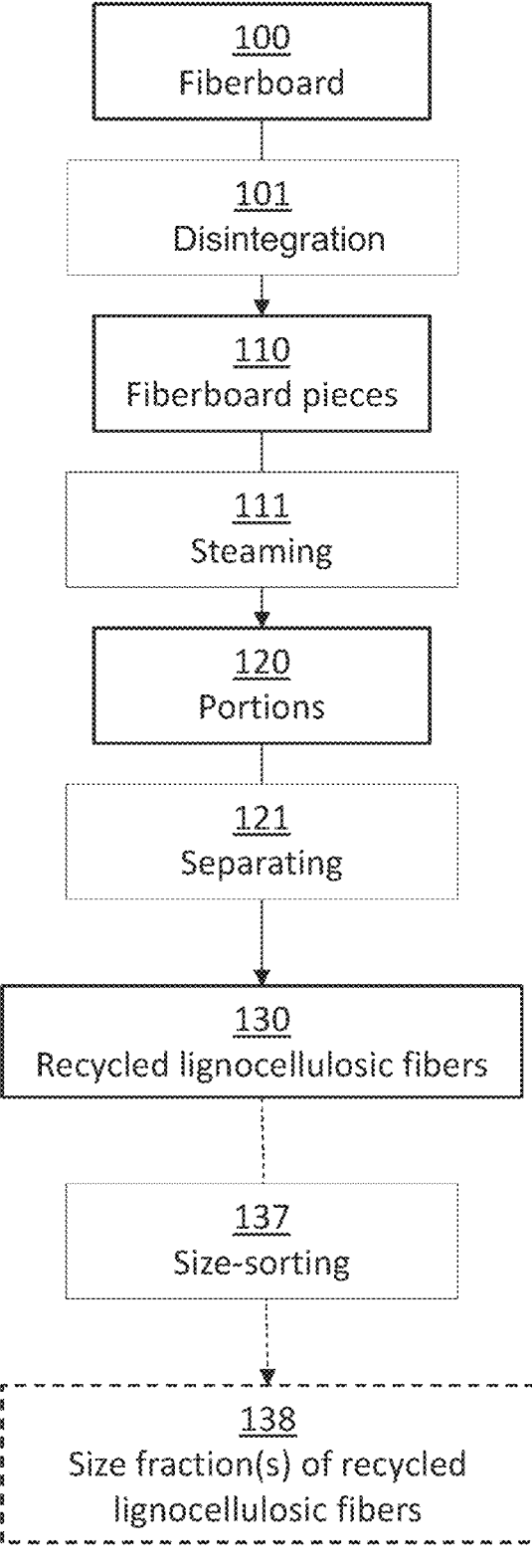
In FIG. 1 a process scheme for recycling lignocellulosic fibers from a fiberboard, according to one embodiment, is provided; and In FIG. 2 a process scheme for the manufacture of a new fiberboard from recycled lignocellulosic fibers, according to one embodiment, is provided.

In FIG. 1, a process scheme for recycling lignocellulosic fibers from a fiberboard (100) is provided. The fiberboard (100) may be a MDF (medium density fiberboard), such as a kitchen front, or it may be a HDF (high density fiberboard), such as a wardrobe backpanel or a component in lightweight sandwich type cabinet walls.

After the consumer has decided to abandon a piece of furniture comprising MDF or HDF, he or she may pass it to the disposal system in place in the region. This can be a municipal recycling station. It can also be a furniture retailer picking up the old furniture when delivering new, or a commercial recycling station. In recycling, furniture is usually sorted into the "recycled wood" container.

The piece of furniture with fiberboard 100 to be recycled is then transported to a wood recycling site. At the wood recycling site, the material is sorted into a recycled wood fraction (essentially free from fiberboard 100) and a fiberboard 100 fraction. In order to provide for efficient use of recycled wood, as well as recycled fiberboard 100, in the production of fiberboard it is preferred to separate them from each other, given that the initial processing steps are distinct.

Depending on the sorting (e.g. manual or automatic), the fiberboard 100 fraction may comprise intact fiberboards 100, typically having a size of 50×100 cm size. In manual sorting it is not necessary to crush the fiberboards 100 into large pieces. In automatic sorting, the fiberboards 100 are typically crushed into large pieces (e.g. 10×10 cm) and subsequently sorted by an automatic sorting machine.

The fiberboards 100 to be recycled (e.g. fiberboard pieces either 50×100 cm or 10×10 cm) is subsequently disintegrated 101 into fiberboard pieces 110. The fiberboards 100 may be disintegrated 101 into fiberboard pieces 110 by shredding and/or hammer milling. Typically, the resulting fiberboard pieces 110 are approximatively 5×5 cm. Subsequently, the fiberboard pieces 110 may be subject to a pre-cleaning step to take metals (magnetic), aluminium, and sand/stones out.

The optionally pre-cleaned fiberboard pieces 110 is subject to further steps to recycle lignocellulosic fibers. The fiberboard pieces 110 are fed via a bunker to a steaming vessel.

In the steaming vessel, the fiberboard pieces 110 are positioned on a distance element to keep them separate from condense water and steamed 111 by pressurizing the steaming vessel with steam. In steaming 111 the fiberboard pieces 110, a steam pressure of 1.5 bar absolute pressure (109° C.) may be used. According to one embodiment, the pressure is increased over 8 minutes to reach 1.5 bar absolute pressure and the fiberboard pieces 110 are kept for 10 minutes at 1.5 bar absolute pressure.

Figure 2:
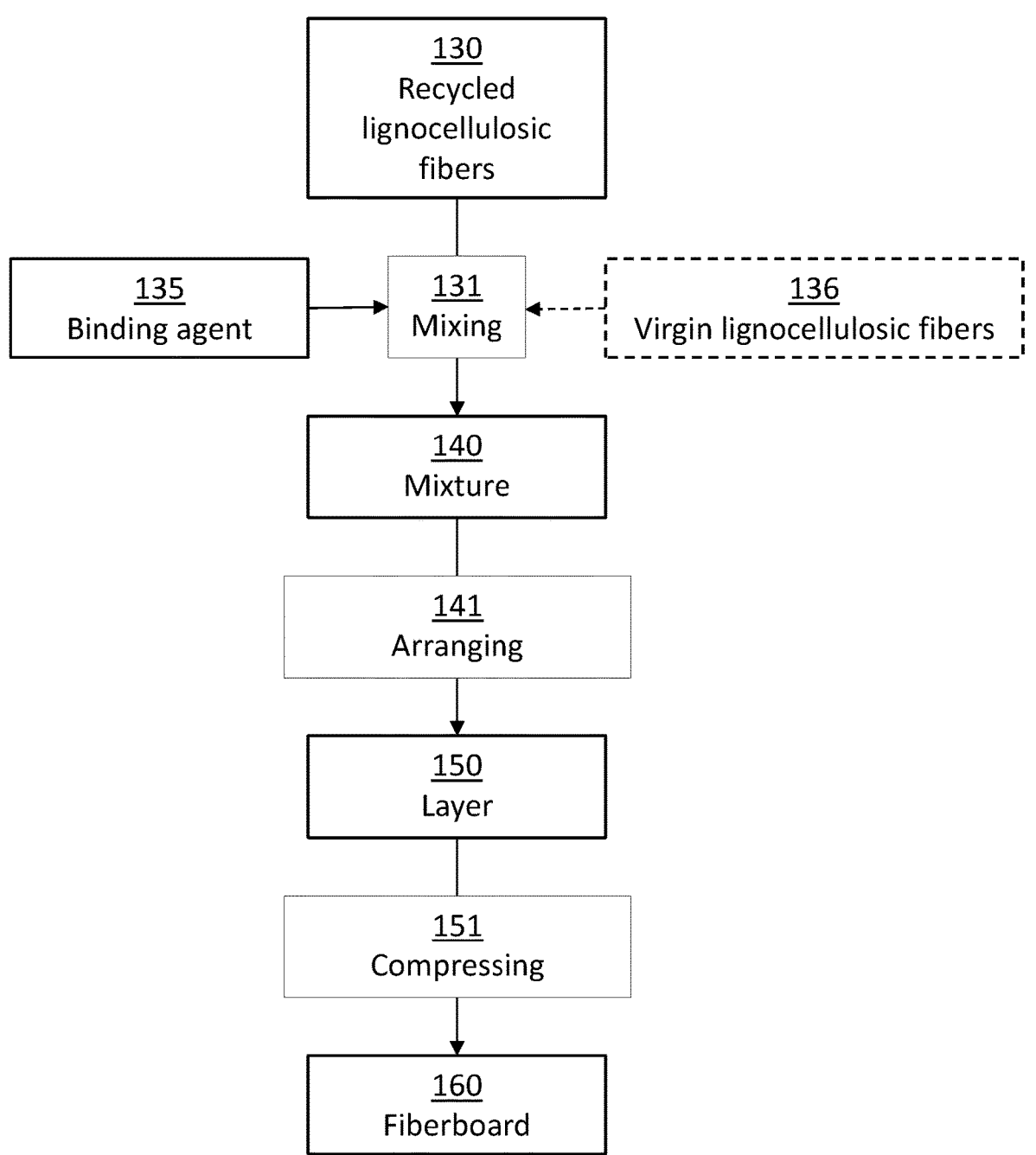

Typically, the fiberboard pieces 110 comprise about 90 wt. % lignocellulosic fibers and 10 wt. % of a binding agent 135 (cf. FIG. 2). The binding agent 135 is typically a urea-formaldehyde resin. The steaming 111 hydrolyzes the binding agent 135 and provides portions 120 comprising released lignocellulosic fibers.

Once the fiberboard pieces 110 has been steamed 111 the steaming vessel is de-pressurized and the resulting hot portions 120 comprising released lignocellulosic fibers are removed. The hot portions 120 comprising released lignocellulosic fibers are slightly coherent. The lignocellulosic fibers in the hot portions 120 comprising released lignocellulosic fibers are however easy to separate 121, e.g. by shredding, crushing, grinding and/or milling the portions 120 comprising released lignocellulosic fibers, into recycled lignocellulosic fibers 130. The residual heat of the recycled lignocellulosic fibers 130 implies that the they dry quickly. In order to support the drying, the recycled lignocellulosic fibers 130 may be tumbled. Optionally, the recycled lignocellulosic fibers 130 may be further dried, such as by subjecting them to a flow of air. The flow of air may be heated air, e.g. having a temperature of 30 to 100° C., such as 40 to 80° C.

Subsequently, the recycled lignocellulosic fibers 130 may be size sorted 137, e.g. by sifting. The size sorting provides one or several size fraction(s) of recycled lignocellulosic fibers 138. In size sorting 137 the recycled lignocellulosic fibers 130, the recycled lignocellulosic fibers 130 may be separated from lumps, plastic, solid wood, and other impurities. The size sorted the recycled lignocellulosic fibers 130 may be provided as one or several size fraction(s) of recycled lignocellulosic fibers 138. The recycled lignocellulosic fibers 130 may be used in production of fiberboard 100.

Thus, recycled lignocellulosic fibers 130 may be mixed 131 with a binding agent 135 (e.g. a urea-formaldehyde resin) and optionally virgin lignocellulosic fibers 136. In mixing 131 recycled lignocellulosic fibers 130 with virgin lignocellulosic fibers 136, the recycled lignocellulosic fibers 130 may either be separately mixed with the binding agent 135 or the recycled lignocellulosic fibers 130 may be mixed with virgin lignocellulosic fibers 136 and binding agent 135.

The resulting mixture 140 of the recycled lignocellulosic fibers 130, the binding agent 135 (e.g. a urea-formaldehyde resin) and the optional virgin lignocellulosic fibers 136 may be passed through an active fiber dryer in order to be dried to ca 5% water content.

From the active fiber dryer, the mixture 140 is conveyed into buffering bunkers. Therefrom, the mixture 140 is fed to continuous forming stations, forming a homogenous layer 150 of the mixture 140 onto a feeding belt. The feeding belt transports the layer 150 into a continuous hotpress, compressing 151 and plastifing the layer 150, and at the same time activating the binding agent 135. After the hot press, the resulting an endless fiberboard 160 is cut, sanded, and confectioned in order to be delivered to a furniture-making factory.

Without further elaboration, it is believed that one skilled in the art may, using the preceding description, utilize the present invention to its fullest extent. The preceding preferred specific embodiments are, therefore, to be construed as merely illustrative and not limitative of the disclosure in any way whatsoever.

Although the present invention has been described above with reference to specific embodiments, it is not intended to be limited to the specific form set forth herein. Rather, the invention is limited only by the accompanying claims and other embodiments than the specific embodiments described above are equally possible within the scope of these appended claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an" "first", "second" etc. do not preclude a plurality.

EXAMPLES

The following examples are mere examples and should by no means be interpreted to limit the scope of the invention, as the invention is limited only by the accompanying claims.

Example 1—Release of Lignocellulosic Fibers According U.S. Pat. No. 6,648,251

While recycling of particleboards is a well-established process, leading to a market-based material stream, fiberboard is generally regarded as non-recyclable. The objective of the initial example was therefore to evaluate recovery of lignocellulosic fibers from fiberboard materials from post-consumer feedstock for new types of fiberboards. Further, also board materials comprising lignocellulosic fibers, e.g. particleboard, Oriented Strand Boards (OSB), solid wood, were part of the evaluation.

The recycling process of U.S. Pat. No. 6,648,251, stated to be useful for recycling particleboards, was taken as a starting point. In short, lignocellulosic fibers were released from the board materials by via hot, saturated steam at temperatures between 120 and 180° C. (2 to 10 bars absolute pressure) in a pressure sealed cylinder. Treatment times of up to 20 minutes were evaluated.

It was shown that even moderate treatment times of around four minutes at 120° C. released the lignocellulosic fibers in common fiberboards (Medium Density Fiberboards MDF/High Density Fiberboards HDF) into single fibers.

Furthermore, it was confirmed that a step of cold pre-swelling leads to an accelerated softening of the used board materials. However, though cold pre-swelling accelerates the softening of the board materials, it also implies that more steam has to be applied in order to heat the pre-swollen material. In addition, the moisture content of the released fibers will be significant higher, impacting the drying thereof. It was concluded that lignocellulosic fibers in common fiberboards (Medium Density Fiberboards MDF/High Density Fiberboards HDF) may efficiently be released without pre-soaking the fiberboards.

It was found that the recycling process of U.S. Pat. No. 6,648,251 seemingly has potential for disaggregating wooden materials like laminate flooring, post-consumer furniture, HPL covered particleboards or higher moisture resistant boards into a processable fiber-particle-pulp. However, the moisture content of the processable fiber-particle-pulp was typically quite high, i.e. 60-80%. Thus, substantial drying was necessary in order to be able to process the recycled lignocellulosic fibers into new fiberboards. It was envisaged (and later confirmed; cf. example 2) that avoiding direct contact with condense water, e.g. by positioning the fiberboard material on a distance element, would provide released lignocellulosic fibers with significantly lower moisture content.

It was further found that neither solid wood, nor isocyanate bonded Oriented Strand Boards (OSB), was readily decomposed into released lignocellulosic fibers within the applied temperatures and exposure times. However, such "higher performing" materials may be processed by softening and defibration conditions similar to the once employed in industrial MDF/HDF production using virgin lignocellulosic fibers.

The subsequent fiber analysis of the mechanically disaggregated fibers shows for all tested variants a fiber length distribution comparable to a non-refined fiberboard, i.e. the fiber length was not significantly affected by the processing conditions. This is important, as the mechanical properties in the final product made out recycled lignocellulosic fibers primarily depend on the fiber length distribution.

Example 2—Release of Lignocellulosic Fibers from a Fiberboard According to the Invention Various mixture of crushed mixtures comprising MDF-pieces (typically 80×30×30 mm) were subject to steaming conditions as indicated in Table 1 below. In the steaming, the crushed mixtures comprising MDF-pieces were placed on distance element to avoid direct contact with condense water. The time to pressure (1.5 bar absolute pressure) was 8 min and the treatment time was 10 min.

TABLE 1

| | | Release of lignocellulosic fibers from a fiberboard | |
|---|---|---|---|
| No. | Temperature (° C.) | Initial and resulting bulk density (kg/m³) | Initial and resulting moisture content (%) |
| 1 | 109 | 259 => 163 | 7 => 25 |
| 2 | 108 | 262 => 86 | 6 => 25 |
| 3 | 111 | 259 => 132 | 7 => 21 |
| 4 | 111 | 262 => 96 | 6 => 20 |
| 5 | 112 | 259 => 162 | 7 => 23 |
| 6 | 105 | 262 => 103 | 6 => 26 |

As can be seen from Table 1, steaming at 1.5 bar for about 15 minutes provided released lignocellulosic fibers (cf. resulting bulk density) with low moisture content.

The invention claimed is:

1. A process for recycling lignocellulosic fibers from a fiberboard comprising compressed lignocellulosic fibers bonded together by a binding agent, the process comprising the steps of:
   disintegrating the fiberboard to provide fiberboard pieces;
   steaming the fiberboard pieces in a steaming vessel by introducing steam into the steaming vessel to expose the fiberboard pieces to steam at a pressure of 1.1 to 10 bar absolute pressure and at a temperature of 103° C. to 180° C. to decompress and release the lignocellulosic fibers by hydrating them, as well as hydrolyzing the binding agent, wherein the moisture content of the fiberboard pieces to be steamed does not exceed 30% based on the dry weight of the fiberboard pieces;
   releasing the overpressure;
   removing excess water vapor to provide portions comprising released lignocellulosic fibers, wherein the moisture content in the portions comprising released lignocellulosic fibers is 15 to 30% based on the dry weight of the portions; and
   separating the lignocellulosic fibers in the portions comprising released lignocellulosic fibers to provide recycled lignocellulosic fibers.

2. The process according to claim 1, wherein the fiberboard pieces are steamed at a pressure of 1.1 to 7 bar absolute pressure and at a temperature of 103° C. to 165° C.

3. The process according to claim 2, wherein the fiberboard pieces are steamed at a pressure of more than 1.1 bar to less than 2 bars and at a temperature of more than 103° C. to less than 120° C.

4. The process according to claim 3, wherein the fiberboard pieces are steamed at a pressure of 1.2 to 1.9 bar absolute pressure and at a temperature of 105° C. to 119° C.

5. The process according to claim 4, wherein the fiberboard pieces are steamed at a pressure of 1.2 to 1.7 bar absolute pressure and at a temperature of 105° C. to 115° C.

6. The process according to claim 1, wherein the residence time in the step of steaming the fiberboard pieces is 1 to 60 minutes.

7. The process according to claim 6, wherein the residence time in the step of steaming the fiberboard pieces is 5 to 20 minutes.

8. The process according to claim 1, wherein the fiberboard is disintegrated by crushing and/or shredding the fiberboard into fiberboard pieces.

9. The process according to claim 1, wherein the process further comprises a step of size-sorting the recycled lignocellulosic fibers to provide size fraction(s) of recycled lignocellulosic fibers.

10. The process according to claim 1, wherein said fiberboard is LDF (Low Density Fiberboard), MDF (Medium Density Fiberboard), or HDF (High Density Fiberboard).

11. The process according to claim 10, wherein said fiberboard is MDF (Medium Density Fiberboard) or HDF (High Density Fiberboard).

12. The process according to claim 1, wherein the steaming is performed in manner such that fiberboard pieces are separated from any condensed water.

13. The process according to claim 1, wherein the fiberboard pieces are present on a distance element for steaming them, whereby keeping the fiberboard pieces, as well as the resulting portions comprising released lignocellulosic fibers, separate from any condensed water.

14. The process according to claim 1, wherein the moisture content of the fiberboard pieces to be steamed does not exceed 25% based on the dry weight of the fiberboard pieces.

15. The process according to claim 14, wherein the moisture content of the fiberboard pieces to be steamed does not exceed 20% based on the dry weight of the fiberboard pieces.

16. The process according to claim 15, wherein the moisture content of the fiberboard pieces to be steamed does not exceed 15% based on the dry weight of the fiberboard pieces.

17. The process according to claim 1, wherein the process further comprises the step of mixing the recycled lignocellulosic fibers with a binding agent, and optionally virgin lignocellulosic fibers, to provide a mixture; arranging the resulting mixture into a layer; and compressing the layer into a fiberboard comprising recycled lignocellulosic fibers, wherein the layer optionally is heated in compressing it into a fiberboard.

18. The process according to claim 1, wherein the steaming of the fiberboard pieces comprises pressurizing the steaming vessel with the steam.

\* \* \* \* \*